(12) United States Patent
Heinrich et al.

(10) Patent No.: US 6,491,596 B1
(45) Date of Patent: Dec. 10, 2002

(54) INFINITELY-VARIABLE PULLEY GEAR

(75) Inventors: Johannes Heinrich, Friedrichsdorf/Taunus (DE); Gert Schönnenbeck, Bad Homburg v.d.H. (DE); Peter Wagner, Biebertal (DE)

(73) Assignee: P.I.V. Antrieb Werner Reimers GmbH & Co. KG, Bad Homburg (DE)

( * ) Notice: Subject to any disclaimer, the term of this patent is extended or adjusted under 35 U.S.C. 154(b) by 0 days.

(21) Appl. No.: 09/522,842

(22) Filed: Mar. 10, 2000

(30) Foreign Application Priority Data

Mar. 10, 1999 (DE) ......................... 199 10 438

(51) Int. Cl.$^7$ ............................................. F16H 55/56
(52) U.S. Cl. ........................................................ 474/8
(58) Field of Search ............................... 474/8, 12, 15, 474/17, 18, 19, 28, 69, 70

(56) References Cited

U.S. PATENT DOCUMENTS

| | | | | |
|---|---|---|---|---|
| 4,261,213 A | * | 4/1981 | Rattunde | 74/196 |
| 4,722,718 A | * | 2/1988 | Eugen | 474/19 |
| 5,045,028 A | * | 9/1991 | Rattunde et al. | 474/17 |
| 5,295,915 A | * | 3/1994 | Friedmann | 474/18 |
| 5,711,730 A | * | 1/1998 | Friedmann et al. | 474/18 |
| 5,879,253 A | * | 3/1999 | Friedmann et al. | 474/18 |
| 6,186,917 B1 | * | 2/2001 | Friedmann et al. | 474/18 |

FOREIGN PATENT DOCUMENTS

| | | | |
|---|---|---|---|
| DE | 28 28 347 | 10/1982 | |
| DE | 3743195 C1 | * 2/1989 | F16H/11/04 |
| GB | WO-91/07613 | * 5/1991 | F16H/61/00 |

* cited by examiner

Primary Examiner—David A. Bucci
Assistant Examiner—Vicky A. Johnson
(74) Attorney, Agent, or Firm—Venable; Robert Kinberg

(57) ABSTRACT

A pulley gear for an infinitely-variable pulley drive has one pulley disposed on a drive shaft and another pulley disposed on an output shaft, and a transmission element circulating between the pulleys. An output side pressing force is applied to the output side pulley by a pressure medium and a drive side pressing force is applied to the drive side pulley by the pressure medium. The pulley gear has a valve that generates a torque-dependent pressure through the torque-dependent relative movement of a first ring, a jacket, and a second ring, thereby providing a load-dependent pressing force. A cylinder and the second ring form a first cylinder-piston aggregate, and the jacket and first and second rings form a second cylinder-piston aggregate. The first ring has a first cam track thereon and the second ring has a second cam track. The surface of the second ring which is exposed to the pressure medium and which has the cam tracks has a greater area than an area of the surface of the second ring exposed to the pressure medium and oriented towards the first cylinder-piston aggregate.

5 Claims, 2 Drawing Sheets

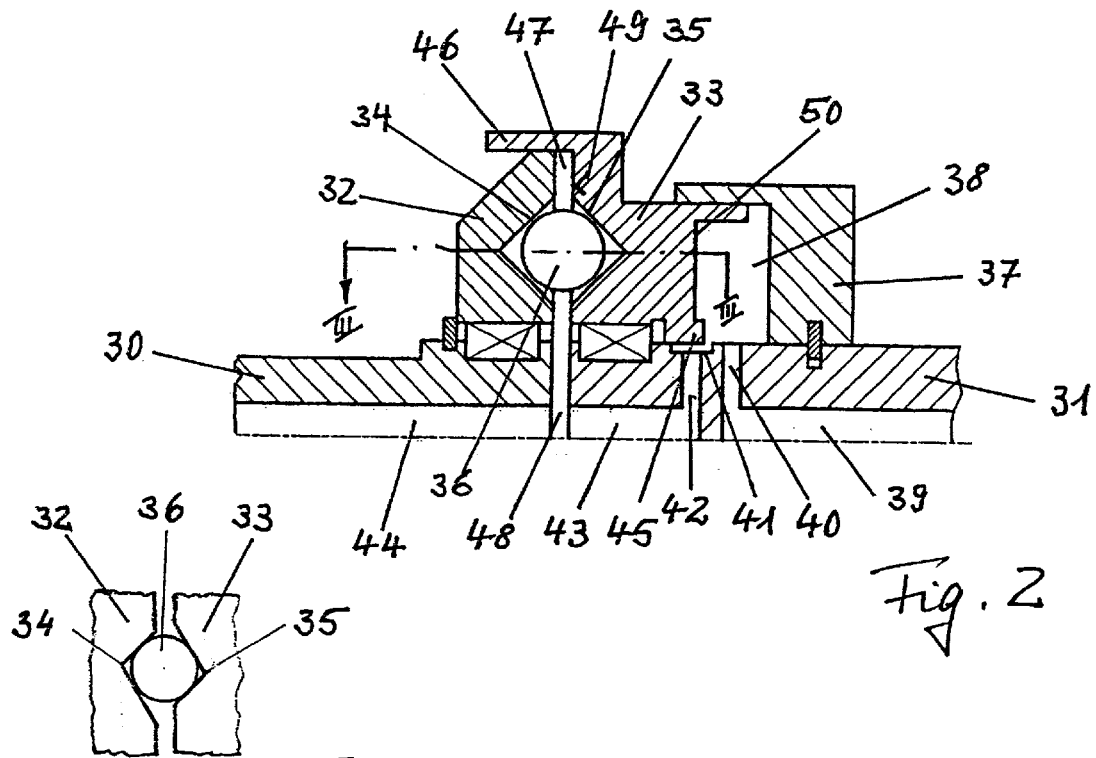
Fig. 2
Fig. 3
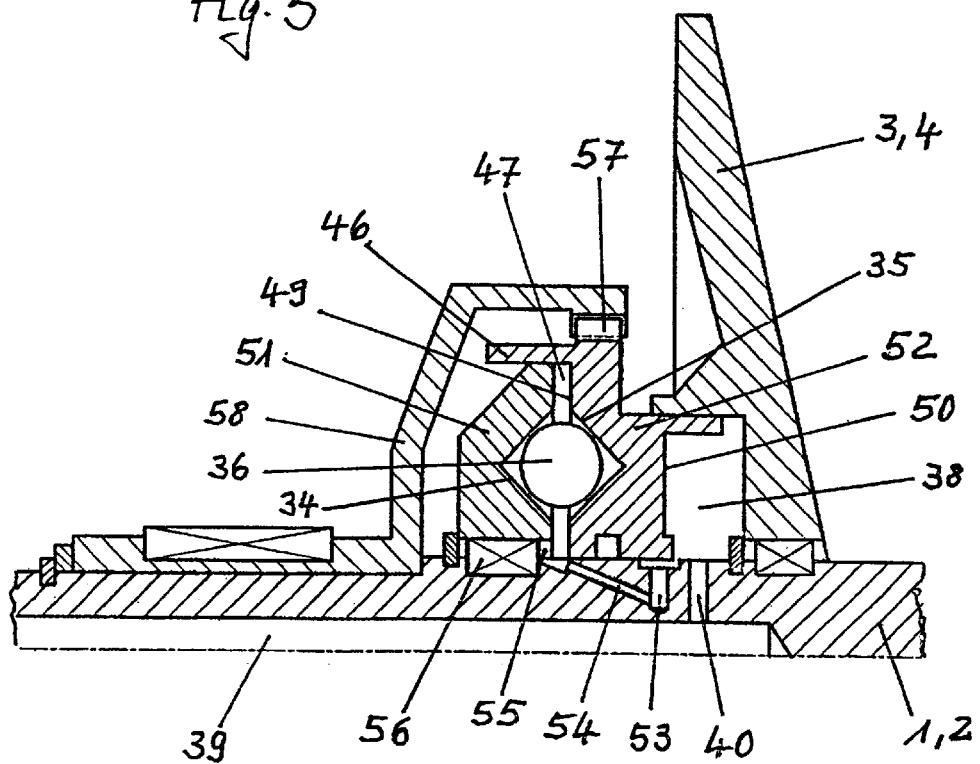
Fig. 4

INFINITELY-VARIABLE PULLEY GEAR

CROSS-REFERENCE TO RELATED APPLICATION

This application claims the priority of German Patent Application No. P 199 10 438.7, filed Mar. 10, 1999, which is incorporated herein in its entirety by reference.

BACKGROUND OF THE INVENTION

The invention relates to an infinitely-variable pulley drive having two pulleys, respectively disposed on the drive shaft and the output shaft, with a transmission element that circulates between the pulleys, and pressing forces for setting and maintaining the gear transmission being generated by a pressure medium on the drive and output pulleys. A sensor is disposed on the drive shaft that receives torque and generates the pressing forces as a function of the load. The pressure medium flows to the sensor with the output-side pressure and the sensor generates a torque-dependent pressure through a torque-dependent relative movement between at least two valve parts of a valve, thereby supplying the necessary load-dependent pressing force. The sensor operates as a torque-dependent pressing device having oppositely-located pressing cam tracks and, between the cam tracks roller bodies are inserted. The first ring of the device, which has one half of the pressing cam tracks, is fixedly secured to the shaft to co-rotate therewith. The other half of the pressing cam tracks is disposed on a second ring, which is disposed to be displaced axially on the shaft, between the first ring and a cylinder that is fixed to the shaft. The second ring and the cylinder form a first cylinder-piston aggregate that is acted upon by the output-side pressure medium. The second ring and the shaft form a valve for the return flow of the pressure medium from the first cylinder-piston aggregate via a shaft bore, with which the chamber between the first and second rings is connected. A chamber between the first and second rings is closed by a cylinder jacket that radially adjoins one of the rings on the outside, is oriented toward the other ring and is coaxial to the drive shaft, the jacket forming a second cylinder-piston aggregate with the other ring.

In such pulley drives, the arrangement is typically such that one of the pulleys can be axially displaced on each shaft, but is connected, at least indirectly, to co-rotate with the shaft, and is embodied as a pressure cylinder of a piston fixed to the shaft, to which the pressure medium is metered by a rectangular control plunger for setting and maintaining the gear transmission, the plunger being, for example, connected via a control lever to one of the axially-displaceable pulleys, while the two other pulleys are fixed axially and against relative rotation with respect to the shaft.

A pulley gear of the type mentioned at the outset is known from, for example, German Patent Document No. 28 28 347. This document also discloses a design in which a torque sensor is seated on the drive shaft of the gear and is charged by the pressure-medium pressure present in an output-side cylinder-piston aggregate.

The fact that the chamber between the first and second sensor rings is closed to the outside in the known gear to form a second cylinder-piston aggregate, as described in detail in the cited document, serves to form another chamber outside of that chamber in order to damp the movement of the second, axially-displaceable ring in one of the two directions of movement with the aid of the pressure-medium volume located in this chamber.

An aspect of the nature of pulley gears of the present type is that, with respect to a particular drive torque, the necessary pressing force between the output-side pulleys and the transmission element circulating between them depends on whether the transmission position of the gear is set at slow or fast output ratio settings. At slow output ratios (i.e., a slower rotation speed on the output side than on the input side) a higher pressing force is required than when the gear is set at faster output ratios. The same is true when, for example, in an application in a motor vehicle, the total overall speed of the gear increases, which also requires a corresponding increase in the level of the pressing forces.

With these circumstances in mind, in gears of the present type, in which the pressing force between the pulleys and the transmission element is determined by a torque sensor, it is desirable to set the output-side pressing force at a higher value when the transmission position is set for a slow output ratio, or when the transmission is operating at a higher total overall gear speed. It is also desirable to avoid overly-high pressing forces when the transmission is set for fast output ratio operation or operating with a low total overall gear speed.

SUMMARY OF THE INVENTION

It is an object of the invention to provide an infinitely-variable pulley gear that avoids the occurrence of overly-high pressing forces when the transmission is set for fast output ratios or operating at a low total overall speed, that also provides a sufficiently high pressing force for transmission positions with a slow output ratio or operation at a high total gear speed.

This object and others to become apparent as the application progresses, are accomplished by the invention, according to which, briefly stated, the surface which is exposed to the pressure medium and which forms part of the second ring has, at its side having the cam track, a greater area than at its side oriented toward the first cylinder-piston aggregate.

This feature according to the invention utilizes the effect exerted by centrifugal force on the pressure medium located in the second cylinder-piston aggregate. According to this effect, at high rotational speeds the pressure medium is exposed to a correspondingly higher centrifugal force, and exerts a correspondingly higher pressure on the axially displaceable, second ring. If the pressure-charged surface of the second ring on the side facing the second cylinder-piston aggregate is larger than on the side facing the first cylinder-piston aggregate, at high output-side speeds at the second ring an additional control variable results at the second ring, which likewise results in an additional throttling effect of the torque sensor, and thus a correspondingly higher pressing force on the output side than at low speeds, without the gear being exposed to an overly high pressure in transmission positions with fast output ratios. The same applies for the above-discussed total gear speed.

The features of the invention, which can employ simple, automatically-acting means, thus avoid application of too much pressure, so the gear operates extremely cost-effectively and reliably.

A design that has proven useful according to the invention is for the outside or major diameter of the second cylinder-piston aggregate to be larger than that of the first cylinder-piston aggregate, with an identical, common inside or minor diameter.

The subject of the invention can be readily implemented in different torque sensor designs, depending on how the drive-side torque is to be introduced because of further structural requirements. For example, the shaft may be divided into segments between the first and second rings, and the torque may be introduced into the gear by way of the shaft part supporting the first ring. It is also possible, however, to introduce the torque into the gear by way of the second ring, in which case the drive shaft is not segmented. Teeth provided at the outer circumference of the second ring, for example, for transmitting force can permit the introduction of the torque via the second ring. Finally, to provide a space-saving design, it can be advantageous for the cylinder for the first cylinder-piston aggregate to be formed by the adjacent pulley that is supported in an axially fixed manner, and fixed against relative rotation with respect to the drive shaft, so that providing a special component for the cylinder is not necessary.

BRIEF DESCRIPTION OF THE DRAWINGS

FIG. 2 shows a first embodiment of a torque sensor, in an axial half-section.

FIG. 3 shows a cutout, sectional view according to the sectional line III—III in FIG. 2.

FIG. 4 shows a second embodiment of a torque sensor in an axial half-section.

DETAILED DESCRIPTION OF THE PREFERRED EMBODIMENTS

Figure 1:
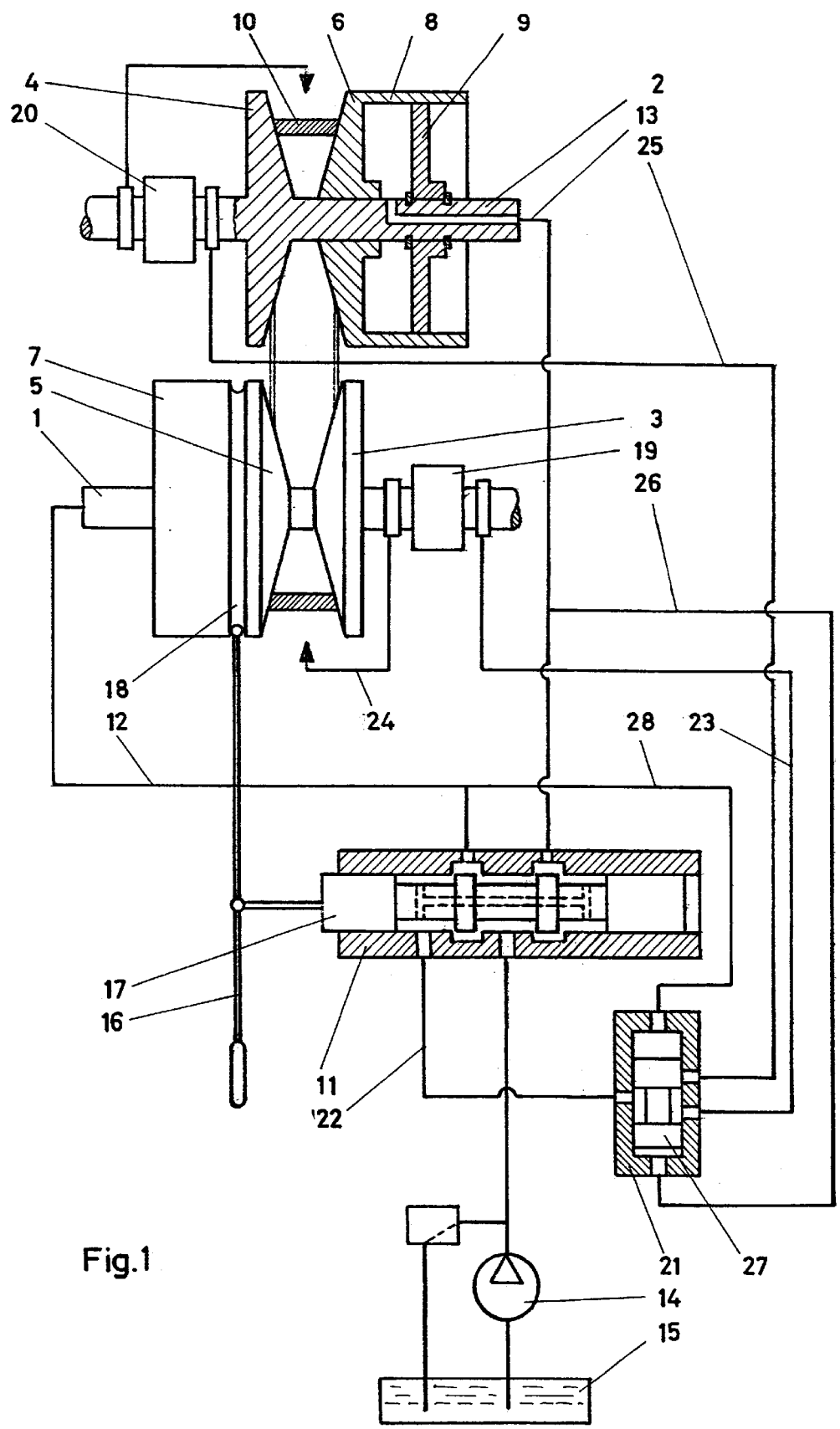
FIG. 1 shows a manually settable pulley gear, partly in section, with torque sensors on both gear sides to accommodate torque reversal.

According to FIG. 1, a pulley gear has a drive shaft 1 carrying a pulley composed of a pair of conical pulley disks 4, 6 and an output shaft 2 carrying a pulley composed of a pair of conical pulley disks 3, 5. The pulley disks 3 and 4 are affixed to the respective shafts 1 and 2, while the pulley disks 5 and 6 are axially displaceable on, but torque-transmittingly connected to, the respective shafts 1 and 2. The pulley disks 5 and 6 form a respective cylinder 7, 8, in which a piston 9 that is fixed axially and against relative rotation to the shafts 1, 2 is disposed. A transmission element 10 circulates between the pulleys 3 through 6.

To maintain or change the gear transmission, a pressure medium drawn by a pressure-medium pump 14 from an oil reservoir 15 is metered to the chambers of the cylinders 7 and 8 by a rectangular control plunger 11 via lines 12 and 13. A free end of a control lever 16, which is connected to the plunger 17 of the rectangular control plunger 11, extends into a groove 18 of the cylinder 7, while its other free end is manually operable.

If the gear is tending to deviate from the manually-set transmission position, it does so via the control lever 16 and its extension into the groove 18 for displacing the control plunger 17, which assures a resetting or maintenance of the manually-set gear transmission in a known manner. The same is true when the transmission position is manually changed at the control lever 16 until the set gear transmission has been attained, and the new transmission status has been established.

The operating mode of the rectangular control plunger 11 in the described example is such that a higher pressure is made available to the drive side via the line 12, while the return flow of the pressure medium conducted to the output side is throttled proportionally to the load. This purpose is served by two torque sensors 19 and 20, each having a throttle valve, and of which only the sensor disposed on the drive side is active for the output side, due to a reversing switch 21.

In the present example, the shaft 1 is a drive shaft. Accordingly, the pressure medium is metered directly to the cylinder 7, due to the position of the plunger 17, by the pump 14 via the line 12, corresponding directly to the setting of the transmission control lever 16. In contrast, in the illustrated equilibrium position, the intake for the pressure medium into the line 13 is opened little, or hardly at all. On the other hand, the pressure medium reaching the torque sensor 19 from there via the outside edge of the plunger 17 and the line 22, 23, is affected by the valve position of the sensor 19, and flows for example via the line 24 for chain lubrication.

This function with the described parts suffices when no change between the drive and output shafts is anticipated in a gear. If this is the case, however, a torque sensor 20 is also provided on the shaft 2 for the event that the shaft 2 is a drive shaft and the shaft 1 is an output shaft. In this case, to activate the torque sensor 20 via the lines 22 and 25, the pressure present in the cylinder 8 on the drive side now reaches the reversing switch 21 via a line 26, where it adjusts the piston 27 upward, relative to the representation in FIG. 1. If the shaft 1 is, again, a drive shaft, the drive-side pressure travels via the line 28 to the piston 27, and restores it to the position shown in the drawing.

The torque sensors 19, 20 according to FIG. 1 can be embodied in the manner illustrated in detail in FIG. 2, where only one half of the torque sensor and the associated shaft arrangement is shown, in an axial section, for the sake of simplicity.

As can be seen in detail in FIG. 2, the respective drive shaft is divided into segments 30, 31, the shaft parts being connected to one another by the torque sensors 19 and 20, each having a valve. A first ring 32 is seated on the shaft segment 30 such that it co-rotates with the shaft segment 30, and is fixed against an axial movement to the left. A second ring 33 is disposed so as to be fixed against relative rotation with the shaft segment 31, but can be axially displaced. At their end faces facing one another, the rings 32 and 33 have cam tracks that are known, and are therefore not described again in detail; they are formed by V-shaped notches 34, 35, in both the radial and circumferential directions (see also FIG. 3), between which roller bodies 36 are inserted for transmitting torque.

A cylinder 37, in which the ring 33 is axially displaceable as a piston, is also secured, at least axially, to the shaft segment 31. The pressure medium coming from the line 23 or 25 with the pressure present on the respective output side of the gear flows to the cylinder chamber 38 formed between the cylinder 37 and the ring 33 via the bore 39 of the shaft segment 31 and an adjoining, radial bore 40, and exits the chamber again via the annular groove 41, an adjoining a radial bore 42, that extends to an axial bore 43 and the conduit 44 of the shaft segment 30. A flange 45 extending into the cylinder chamber 38 and the annular groove 41 together form the throttle valve.

The torque sensors 19 and 20 described above operate as follows:

Corresponding to the torque to be transmitted between the shaft segments 30, 31 forming the drive shaft 1 or 2, the rings 32 and 33 endeavor to rotate opposite one another in the circumferential direction, which causes the ring 33 to be displaced more or less to the right, with respect to FIG. 2, due to the V-shaped notches 34, 35 and the interposed roller bodies 36. This causes the flange 45 to close the annular groove 41, so the pressure medium flowing into the cylinder chamber 38 via 23 or 25 and 39 and 40 flows off more or less until the pressure-medium pressure present in the cylinder chamber 38 maintains the equilibrium of the axial force at the ring 33, which force is exerted from the other side due to the V-shaped notches 34, 35 and the roller bodies 36. Thus, however, the pressure-medium pressure that is required in the pressure chamber of the respective output-side cylinder 8 or 7 also is present in the cylinder chamber 38, because the cylinder chamber 38 is connected to this pressure chamber via the bore 39.

As explained at the outset, in the transmission setting of the gear according to FIG. 1 at slow output ratios, or at a high total gear speed on the output side of the gear—with respect to a specific torque to be transmitted—a higher pressing force is necessary between the pulleys and the transmission element 10 than is required in the transmission position of the gear at fast output ratios or at low total gear speeds. To take this into account, one of the rings, in the present case the ring 33, is provided with a cylinder jacket 46, which is coaxial to the shaft segments 30, 31 and extends axially beyond the other ring, in this case the ring 32, the ring 32 being disposed in the manner of a piston inside the jacket. The chamber 47 formed between the rings 32, 33 is embodied as a closed pressure chamber, to which the pressure medium flowing off along the bores 43, 44 flows via the separating seam 48 between the shaft segments 30, 31 due to the effect of centrifugal force.

The arrangement is also such that the surface 49, which is charged with the pressure medium and by which the ring 33 faces the chamber 47, is larger than the surface 50, which is also charged with the pressure medium and by which the ring 33 faces the cylinder chamber 38. As the speed of the torque sensor 19 or 20 increases, a greater axial force is exerted on the ring 33 from the sides of the chamber 47 than from the sides of the cylinder chamber 38; consequently, the ring 33 is adjusted accordingly to the right, in reference to FIG. 2, and an additional throttling effect occurs between the flange 45 and the annular groove 41.

As the drive-side speed increases, as in the case of an adjustment of the gear transmission to a slow output ratio or an increase in the total overall gear speed, the drive-side torque sensor effects an additional throttling for the return flow of the pressure medium having the pressure dominating on the output side of the gear, and therefore causes an increase in the pressure-medium pressure present on the output side, and an increase in the output-side pressing force between the pulleys and the transmission element 10. Taken alone, this increase in the output-side pressing force would force the gear out of the desired transmission position. This is prevented, however, by the extension of the control lever 16 into the circumferential groove 18, and its connection to the plunger 17, because a tendency of the gear to leave the desired transmission position is counteracted by the associated position of the plunger. In the present case, the aforementioned increase in the output-side pressing force via the plunger 17 also leads to a corresponding increase in the drive-side pressure-medium pressure, and therefore the drive-side pressing force, until the gear is again located in the equilibrium state in the desired transmission position.

The design according to FIG. 2 is intended to introduce the torque directly and axially into the gear via the drive shaft embodied by two segments 30, 31. For specific structural reasons, however, it may also be desirable to work with an undivided drive shaft, or to introduce the torque into the drive shaft radially.

FIG. 4 illustrates a design for the torque sensor that permits this option. Here, the torque sensor seated on the undivided drive shaft 1 or 2 again has a first ring 51, which is fixed in the axial and circumferential directions, and a second ring 52, which is displaceable opposite the first ring, both in the axial and circumferential directions, and otherwise corresponds in its structural embodiment, including the cylinder chamber 38 and the pressure chamber 47 between the rings, to the design shown in FIG. 2; therefore, the explanations given above are not repeated here—refer to the reference characters given in the above description.

The return flow of the pressure medium from the cylinder chamber 38 is effected here by the modified construction, starting from a radial blind bore 53, through a connecting channel 54 and the axial inside groove 55 of the ring 51, which is connected via a feather key 56 so as to co-rotate with the shaft 1, 2. Once outside of the ring 51, the pressure medium travels along teeth 57 into a free space; a drive bell 58 engages the ring 52 via these teeth, with a corresponding engaging teeth, the drive bell 58 being seated to rotate on the shaft 1, 2, but supported against axial movement.

Instead of the drive bell 58, a spur gear, for example, could engage the teeth 57 of the ring 52 in the same manner.

A further difference between the design according to FIG. 4 and the design according to FIG. 2 is that, in FIG. 4, the cylinder for the pressure chamber 38 is formed directly by the pulley disk 3 or 4 adjacent to the torque sensor, that is, the pulley of the respective drive-side disk set that is fixed in the axial and circumferential directions, which eliminates the requirement of a separate cylinder for the cylinder chamber 38. Of course, the cylinder 37 according to FIG. 2 can also be replaced by a correspondingly-designed pulley that is fixed to the shaft, in the manner described in conjunction with FIG. 4.

The operating mode of the torque sensor explained in conjunction with FIG. 4 otherwise corresponds to the operating mode of the torque sensor according to FIG. 2; refer to those explanations.

It will be understood that the above description of the present invention is susceptible to various modifications, changes and adaptations, and the same are intended to be comprehended within the meaning and range of equivalents of the appended claims.

What is claimed is:

1. A pulley gear for an infinitely-variable pulley drive comprising:

a first pulley formed by a pair of conical pulley disks; one of the pulley disks of said first pulley being axially movable relative to the other of the pulley disks of said first pulley, said first pulley disposed on a drive shaft;

a second pulley formed by another pair of conical pulley disks; one of the pulley disks of said second pulley being axially movable relative to the other of the pulley disks of said second pulley, said second pulley disposed on an output shaft;

a transmission element circulating between the pulleys;

means for applying an output side pressing force to said output side pulley via a pressure medium;

means for applying a drive side pressing force to said drive side pulley via the pressure medium;

a first ring fixedly supported axially on said drive shaft and connected to co-rotate with said drive shaft, said first ring having a first cam track thereon;

a cylinder that is fixed to said drive shaft;

a second ring disposed to be displaced axially on said drive shaft, disposed between said first ring and said cylinder, and having a first surface facing said first ring exposed to the output-side pressure medium with the output-side pressure, said second ring also having a second cam track on said first surface, said first and second cam tracks opposed to each other, and said second ring and said cylinder together forming a first cylinder-piston aggregate having a first chamber that is acted upon by the pressure medium, and said second ring having a second surface oriented towards said first cylinder-piston aggregate, and said second ring and the drive shaft forming a valve for controlling the return flow of the pressure medium from the first chamber of said first cylinder-piston aggregate via a bore disposed in said output shaft;

a cylinder jacket radially adjoining one of said first and second rings adjacent its outside diameter, and oriented toward the other said ring and being coaxial to the said shaft, said jacket and said first and second rings forming a second cylinder-piston aggregate having a second chamber; and a set of roller bodies disposed between said first and second cam tracks, wherein the pulley gear generates a torque-dependent pressure through the torque-dependent relative movement of said first ring, said jacket, and said second ring, thereby providing a load-dependent pressing force, and wherein said first surface of said second ring which is exposed to the pressure medium and has said cam tracks has a greater area than an area of said second surface which is exposed to the pressure medium and is oriented towards said first cylinder-piston aggregate.

2. The pulley gear as defined in claim 1, wherein an outer diameter of said second cylinder-piston aggregate is larger than an outer diameter of said first cylinder-piston aggregate, and said first and second cylinder-piston aggregates each have identical inner diameters.

3. The pulley gear as defined in claim 1, wherein the drive shaft is divided into a first shaft segment supporting said first ring and a second shaft segment supporting said second ring, and torque is introduced via said first shaft segment.

4. The pulley gear as defined in claim 1, wherein torque is introduced into the gear via said second ring.

5. The pulley gear as defined in claim 1, wherein said cylinder is formed by a portion of the drive side pulley that is supported so as to be fixed axially and against relative rotation with respect to the drive shaft.

* * * * *